J. H. STICKELL.
DRAFT EQUALIZER.
APPLICATION FILED MAY 21, 1915.
1,221,622. Patented Apr. 3, 1917.
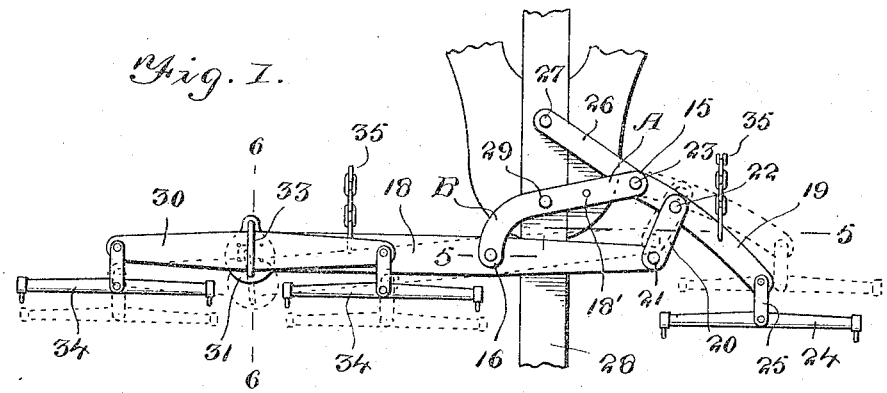
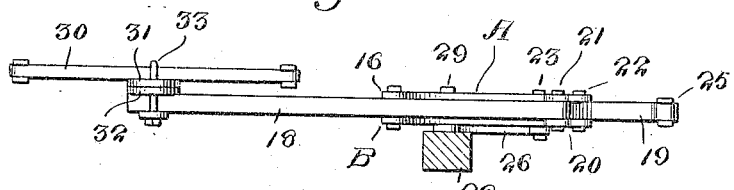
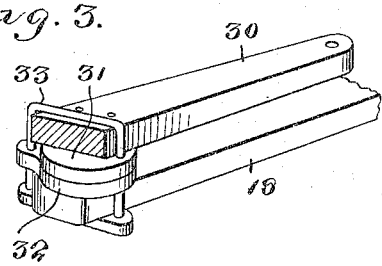
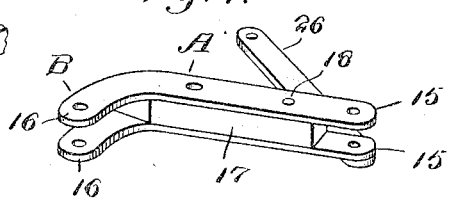
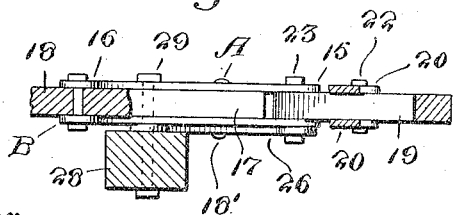
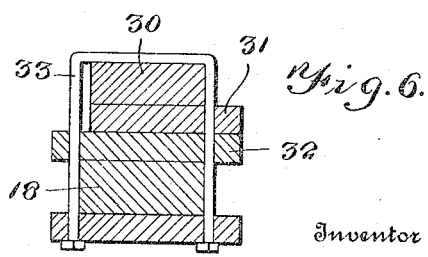
Inventor
J. H. Stickell
By Victor J. Evans
Attorney
Witnesses

UNITED STATES PATENT OFFICE.

JOHN H. STICKELL, OF WILLIAMSON, PENNSYLVANIA.

DRAFT-EQUALIZER.

1,221,622.    Specification of Letters Patent.    Patented Apr. 3, 1917.

Application filed May 21, 1915. Serial No. 29,573.

*To all whom it may concern:*

Be it known that I, JOHN H. STICKELL, a citizen of the United States, residing at Williamson, in the county of Franklin and State of Pennsylvania, have invented new and useful Improvements in Draft-Equalizers, of which the following is a specification.

This invention relates to draft equalizers, and it has particular reference to three-horse equalizers.

The invention has for its object to produce a three-horse equalizer for general use by the use of which the strain exerted by the draft animals will be equalized as between two animals pulling together and a third animal pulling by itself.

A further object of the invention is to produce a three-horse equalizer by the use of which side draft will be practically eliminated.

A further object of the invention is to produce a simple, improved and effective connection between equalizing members constituting parts of the device.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a top plan view of the improved draft equalizer, with dotted lines showing a different position of the parts.

Fig. 2 is a front view.

Fig. 3 is a perspective view of that end of the equalizer to which two horses are hitched.

Fig. 4 is a perspective view of the supporting bracket and related parts.

Fig. 5 is a sectional detail view taken on the line 5—5 in Fig. 1.

Fig. 6 is a sectional detail view taken on the line 6—6 in Fig. 1.

Corresponding parts in the several figures are denoted by like characters of reference.

The bracket A which forms the main support of the improved equalizer is of curved or arcuate shape to present at one end a forwardly extending arm B, said bracket and arm being each provided with terminal lugs 15, 16. The bracket member may be formed, as indicated in the drawing, of two suitably curved straps or bars spaced apart by an intermediate block 17 with which said straps are connected by means of fastening members, such as rivets 18'.

Fulcrumed between the lugs 16 of the arm B is a lever 18, and fulcrumed between the lugs 15 of the bracket member A is a lever 19, the latter being connected with the lever 18 by means of links 20, said links being pivotally connected with the proximate end of the lever 18 by a pin or pivot member 21. The pivot member 22 which connects the links 20 with the lever 19 is located relatively near the fulcrum of said lever which is formed by a pin or bolt 23 engaging the lugs 15 of the bracket member A. A swingletree 24 is connected with the lever 19 by a pivot member 25, and it will be noticed that the distance between the pivot members 25 and 22 materially exceeds the distance between the pivot members 22 and 23. The pivot member 23 also serves for the attachment of one end of a brace 26, the other end of which is connected by a pin or bolt 27 with the tongue 28 of the vehicle or implement to which draft is to be applied. The bracket member A is likewise mounted on the tongue by the hammer bolt 29 which, in connection with the brace 26 and the attaching means, serves to support the bracket member in rigid position with respect to the tongue.

The lever 18 supports at the end opposite to that with which the links 20 are connected a doubletree 30, said doubletree having a flat under face on which is secured a wear plate 31 that extends beyond the front edge of said doubletree on which said wear plate is firmly secured. A wear plate 32 is likewise secured on the flat upper face of the lever 18, said wear plate being of such a width as to project beyond the front and rear edges of said lever. The parts are assembled together by means of a clip 33 which straddles the doubletree, one limb of said clip extending through the projecting portions of the wear plates 31, 32 to the forward of the lever 18, the other limb extending through the projecting portion of the wear plate 32 to the rearward of said lever. The swingletrees 34 are connected in the customary manner with the ends of the doubletree 30.

It will be readily understood that by properly proportioning and arranging the parts of this device, the leverage exerted by the lever 19 on one arm of the lever 18 under the draft strain exerted by one horse will equalize the draft strain exerted by two horses on the other arm of the lever 18. The fulcrum of the latter is, moreover, offset from the tongue 28 in the direction of the end of the lever 18 to which two horses are attached, thereby giving to the single draft animal the advantage as regards side draft, and causing the vehicle or implement to which the equalizer is attached to be drawn evenly and without the jerky motion which is ordinarily apt to result when three horses are attached.

By mounting the doubletree on the lever 18 in the manner described great structural strength is obtained, the use of bolts being eliminated with the consequent necessity of weakening the parts by piercing the same for the passage of bolts. The doubletree will be securely maintained in its proper position with relation to the lever 18 without possibility of twisting or buckling. It is obvious that when desired a similar construction may be adopted for mounting the swingletrees on the doubletrees as well as on the lever 19.

Stay chains 35 have been shown as being connected, respectively, with the lever 18 and the lever 19 for connecting said levers with the axle of the vehicle or implement, not shown, to which the invention is to be applied for the purpose of limiting the forward movement of said levers under the draft strain applied thereto.

Having thus described the invention, what is claimed as new, is:—

An implement tongue, a bracket supported thereon and extending at both sides thereof, said bracket having a forwardly extending arm adjacent to one side of the tongue, and said bracket and arm having terminal lugs, a pivot member extending through the lugs of the bracket, a brace connecting the pivot member with the tongue, a lever fulcrumed on the pivot member and having a swingletree connected therewith, a lever fulcrumed between the lugs of the arm, said lever having long and short arms, the short arm extending transversely across the tongue, a link connecting the short arm of the last mentioned lever with the first mentioned lever, and a doubletree carried by the long arm of the last mentioned lever.

In testimony whereof I affix my signature in presence of two witnesses.

JOHN H. STICKELL.

Witnesses:
Wm. Bagger,
H. Hough.

Copies of this patent may be obtained for five cents each, by addressing the "Commissioner of Patents, Washington, D. C."